(12) United States Patent
Baskin et al.

(10) Patent No.: US 11,972,347 B2
(45) Date of Patent: Apr. 30, 2024

(54) SYSTEM AND METHOD FOR EMULATING QUANTIZATION NOISE FOR A NEURAL NETWORK

(71) Applicants: Technion Research & Development Foundation Limited, Haifa (IL); Ramot at Tel-Aviv University Ltd., Tel-Aviv (IL)

(72) Inventors: Chaim Baskin, Kiryat Motzkin (IL); Eliyahu Schwartz, Tel-Aviv (IL); Evgenii Zheltonozhskii, Kiryat Motzkin (IL); Alexander Bronstein, Haifa (IL); Natan Liss, Haifa (IL); Abraham Mendelson, Haifa (IL)

(73) Assignees: Technion Research & Development Foundation Limited, Haifa (IL); Ramot at Tel-Aviv University Ltd., Tel-Aviv (IL)

( * ) Notice: Subject to any disclaimer, the term of this patent is extended or adjusted under 35 U.S.C. 154(b) by 861 days.

(21) Appl. No.: 17/049,651

(22) PCT Filed: Apr. 22, 2019

(86) PCT No.: PCT/IL2019/050457
§ 371 (c)(1),
(2) Date: Oct. 22, 2020

(87) PCT Pub. No.: WO2019/207581
PCT Pub. Date: Oct. 31, 2019

(65) Prior Publication Data
US 2021/0241096 A1    Aug. 5, 2021

Related U.S. Application Data

(60) Provisional application No. 62/661,016, filed on Apr. 22, 2018.

(51) Int. Cl.
*G06N 3/08* (2023.01)
*G06F 18/211* (2023.01)
(Continued)

(52) U.S. Cl.
CPC ............. *G06N 3/08* (2013.01); *G06F 18/211* (2023.01); *G06F 18/23* (2023.01); *G06N 3/048* (2023.01)

(58) Field of Classification Search
CPC ........ G06N 3/08; G06N 3/048; G06F 18/211; G06F 18/23
See application file for complete search history.

(56) References Cited

U.S. PATENT DOCUMENTS

2016/0034814 A1    2/2016  Audhkhasi et al.
2016/0086078 A1    3/2016  Ji et al.

OTHER PUBLICATIONS

Krogh, Anders. "What are artificial neural networks?." Nature biotechnology 26.2 (2008): 195-197. (Year: 2008).*

(Continued)

*Primary Examiner* — Kevin W Figueroa

(57) ABSTRACT

A system for training a quantized neural network dataset, comprising at least one hardware processor adapted to: receive input data comprising a plurality of training input value sets and a plurality of target value sets; in each of a plurality of training iterations: for each layer, comprising a plurality of weight values, of one or more of a plurality of layers of a neural network: compute a set of transformed values by applying to a plurality of layer values one or more emulated non-uniformly quantized transformations by adding to each of the plurality of layer values one or more uniformly distributed random noise values; and compute a plurality of output values; compute a plurality of training output values; and update one or more of the plurality of weight values to decrease a value of a loss function; and (Continued)

output the updated plurality of weight values of the plurality of layers.

16 Claims, 9 Drawing Sheets

(51) Int. Cl.
*G06F 18/23* (2023.01)
*G06N 3/048* (2023.01)

(56) References Cited

OTHER PUBLICATIONS

Audhkhasi, Kartik, Osonde Osoba, and Bart Kosko. "Noise-enhanced convolutional neural networks." Neural Networks 78 (2016): 15-23. (Year: 2016).*
Louizos, Christos, et al. "Relaxed quantization for discretized neural networks." arXiv preprint arXiv:1810.01875 (2018). (Year: 2018).*
International Search Report and the Written Opinion Dated Jul. 30, 2019 From the International Searching Authority Re. Application No. PCT/IL2019/050457. (11 Pages).
Han et al. "Deep Compression: Compressing Deep Neural Networks With Pruning, Trained Quantization and Huffman Coding", ArXiv Preprint arXiv:1510.00149v5, p. 1-14, Feb. 15, 2016.
Ullrich et al. "Soft Weight-Sharing for Neural Network Compression", arXiv Preprint arXiv:1702.04008v1, p. 1-16, Feb. 13, 2017.
Zur et al. "Noise Injection for Training Artificial Neural Networks: A Comparison With Weight Decay and Early Stopping", Medical Physics, 36(10):4810-4818, Published Online Sep. 25, 2009.

* cited by examiner

SYSTEM AND METHOD FOR EMULATING QUANTIZATION NOISE FOR A NEURAL NETWORK

RELATED APPLICATIONS

This application is a National Phase of PCT Patent Application No. PCT/IL2019/050457 having International filing date of Apr. 22, 2019, which claims the benefit of priority under 35 USC § 119(e) of U.S. Provisional Patent Application No. 62/661,016 filed on Apr. 22, 2018. The contents of the above applications are all incorporated by reference as if fully set forth herein in their entirety.

BACKGROUND

The present invention, in some embodiments thereof, relates to a computerized system executing a neural network and, more specifically, but not exclusively, to a computerized system executing a quantized neural network.

The term neural network is commonly used to describe a computer system modeled on the human brain and nervous system. A neural network usually involves a large number of processing objects operating in parallel and arranged and connected in layers (or tiers). A first layer receives raw input information (one or more input values), analogous to optic nerves in human visual processing or auditory receptor neurons in human sound processing. Each successive layer receives an output from one or more layers preceding it, rather than from the raw input—analogous to neurons further from an optic nerve or auditory receptor neuron receiving signals from neurons closer to the optic nerve or auditory receptor neuron. A last layer produces an output of the neural network. For example, in computer vision the raw input information may be one or more images, and the output may be one or more feature classifications detected in the image. In neural network systems used for regression, the output may be a predicted value computed according to one or more values in the raw input information. The term "deep" in Deep Neural Networks refers to the amount of layers in such a neural network. A typical computation in a neural network layer involves summing a plurality of products between an input value and an associated weight, and mapping the resulting sum to an output value. The term "activation function" refers to the mapping of the resulting sum to an output value, being a non-linear transformation done over a value before being sent as input into a next layer, signifying whether the information represented by the resulting sum is relevant for the given input or should be ignored. Training a neural network refers to a process of adjusting a plurality of weight values of the plurality of layers of the neural network according to error terms between a computed output value and an expected output value of a set of input values, such that in a next iteration the computed output value will be closer to the known expected output value than in a previous iteration.

A typical deep neural network comprises millions of parameters and may require millions of arithmetic operations, requiring computation and digital memory resources exceeding capabilities of many devices, for example mobile devices, some embedded devices and some custom hardware devices. There is a need for some mobile device applications to utilize neural networks, for example a mobile device application using computer vision. Some applications may be designed such that a device communicates with a remote service, for example a cloud implemented service, which performs computations using a neural network. However, such architecture requires a network connection which might not always be available, and may incur latency limitations. The neural network's plurality of weight values is stored in memory. Reducing an amount of storage required to store each weight may allow fitting on a device a larger neural network than a neural network using weight requiring larger storage. In addition, output values of a neural network's activation functions are passed between layers. Reducing a size of an activation function value may increase processing speed, as well as decrease communication bandwidth between layers.

One way of reducing computational and storage cost of a neural network is quantization of some of the neural network's plurality of weight values and activation function output values (hereinafter activation values). Quantization is a process of constraining an input from a large set of original values to a discrete set of quantized values. The discrete set of quantized values typically has fewer values than the large set of original values.

In some neural networks, the plurality of weight values and activation values are real (non-integer) numbers. In a typical deep neural network the neural network's plurality of weight values and plurality of activation values are represented in 32-bit single precision floating point numbers for both training and using the trained neural network. Quantizing the plurality of weight values to a fixed point representation using fewer than 32 bits (for example, 8 bits or 16 bits) may allow reducing storage required to store the neural network, without significantly impacting accuracy of the neural network's output.

SUMMARY

It is an object of the present invention to provide a system and a method for training a quantized neural network and a system and a method for using a trained quantized neural network.

The foregoing and other objects are achieved by the features of the independent claims. Further implementation forms are apparent from the dependent claims, the description and the figures.

According to a first aspect of the invention, a system for training a classification system's quantized neural network dataset comprises at least one hardware processor adapted to: receive digital input data comprising a plurality of training input value sets and a plurality of target value sets; in each training iteration of a plurality of training iterations: for each layer, comprising a plurality of weight values, of one or more layers of a plurality of layers of a neural network: compute a set of transformed values by applying to a plurality of layer values, comprising a plurality of previous layer output values of a previous layer and the layer's plurality of weight values, one or more emulated non-uniformly quantized transformations by adding to each value of the plurality of layer values one or more uniformly distributed random noise values; and compute a plurality of layer output values by applying to the set of transformed values one or more arithmetic operations; compute a plurality of training output values from a combination of the plurality of layer output values of a last layer of the plurality of layers; and update one or more of the plurality of weight values of the one or more layers to decrease a value of a loss function computed using the plurality of target value sets and plurality of training output values; and output the updated plurality of weight values of the plurality of layers.

According to a second aspect of the invention, a method for training a classification system's quantized neural network dataset comprises: receiving by at least one hardware processor digital input data comprising a plurality of training input value sets and a plurality of target value sets; in each training iteration of a plurality of training iterations: for each layer, comprising a plurality of weight values, of one or more layers of a plurality of layers of a neural network: computing a set of transformed values by applying to a plurality of layer values, comprising a plurality of previous output values of a previous layer and the layer's plurality of weight values, one or more emulated non-uniformly quantized transformations by adding to each value of the plurality of layer values one or more uniformly distributed random noise values; and computing a plurality of output values by applying to the set of transformed values one or more arithmetic operations; computing a plurality of training output values from a combination of the plurality of output values of a last layer of the plurality of layers; and updating one or more of the plurality of weight values of the one or more layers to decrease a value of a loss function computed using the plurality of target value sets and plurality of training output values; and outputting the updated plurality of weight values of the plurality of layers.

According to a third aspect of the invention, a system for detection and classification of findings in digital data comprises at least one hardware processor configured to: accessing a non-uniformly quantized neural network data; and classifying at least one finding detected in the digital data according to the non-uniformly quantized neural network data set in response to receiving the digital data.

According to a fourth aspect of the invention, a system for regression of digital data comprises at least one hardware processor configured to: accessing a non-uniformly quantized neural network data; and predicting at least one output value according to the non-uniformly quantized neural network data set in response to receiving the digital data.

With reference to the first and second aspects, in a first possible implementation of the first and second aspects of the present invention, the at least one hardware processor applies the one or more emulated non-uniformly quantized transformations to the plurality of layer values to compute a set of transformed values by: applying to each previous layer output value of the plurality of previous layer output values a first emulated non-uniformly quantized transformation by adding a first uniformly distributed random noise value, having a first distribution having a first variance, to produce a set of transformed output values; applying to each weight value of the layer's plurality of weight values a second emulated non-uniformly quantized transformation by adding a second uniformly distributed random noise value, having a second distribution having a second variance, to produce a set of transformed weight values; and combining the set of transformed output values with the set of transformed weight values to produce the set of transformed values. Applying a first emulated non-uniformly quantized transformation to the plurality of previous layer output values and a second emulated non-uniformly quantized transformation to the plurality of weight values may facilitate producing a quantized neural network that produces output sufficiently accurate according to an identified distance metric compared to output of a non-quantized neural network. Optionally, applying to a previous layer output value a first emulated non-uniformly quantized transformation by adding a first uniformly distributed random noise value comprises: computing a first non-linear transformation of the previous layer output value to produce a transformed output value; adding the first uniformly distributed random noise value to the transformed output value to produce a noisy output value; and computing an inverse first non-linear transformation of the noisy output value, wherein the inverse first non-linear transformation is such that computing the inverse first non-linear transformation of the transformed output value produces the previous layer output value. Optionally, applying to a weight value a second emulated non-uniformly quantized transformation by adding a second uniformly distributed random noise value comprises: computing a second non-linear transformation of the weight value to produce a transformed weight value; and adding the second uniformly distributed random noise value to the transformed weight value to produce a noisy weight value; and computing an inverse second non-linear transformation of the noisy weight value, wherein the inverse second non-linear transformation is such that computing the inverse second non-linear transformation of the transformed weight value produces the weight value. Using a non-linear transformation allows using uniformly distributed noise. Optionally, the first non-linear transformation comprises a first combination of a first plurality of arithmetic operations selected from a group of arithmetic operators consisting of: addition, multiplication, and at least one non-linear operator. Optionally, the second non-linear transformation comprises a second combination of a second plurality of arithmetic operations selected from the group of arithmetic operators.

With reference to the first and second aspects, or the first implementation of the first and second aspects, in a second possible implementation of the first and second aspects of the present invention, the transformed output value is in the range from 0 to 1; and the transformed weight value is in the range from 0 to 1. Optionally, the transformed output value is selected from a first set consisting of a first identified amount of values, each in the range from 0 to 1, and the transformed weight value is selected from a second set consisting of a second identified amount of values, each in the range from 0 to 1. Optionally, the first uniformly distributed random noise value has a first uniform distribution in a first identified range from a first identified lower value to a first identified upper value, the first identified lower value is computed by dividing −1 by the product of 2 and the first identified amount of values, the first identified upper value is computed by dividing 1 by the product of 2 and the first identified amount of values, the second uniformly distributed random noise value has a second uniform distribution in a second identified range from a second identified lower value to a second identified upper value, the second identified lower value is computed by dividing −1 by the product of 2 and the second identified amount of values, and the second identified upper value is computed by dividing 1 by the product of 2 and the second identified amount of values. Quantizing in the range of 0 to 1 may allow using noise uniformly distributed in a range proportional to an amount of quantization bins.

With reference to the first and second aspects, or the first or second implementations of the first and second aspects, in a third possible implementation of the first and second aspects of the present invention, the at least one hardware processor is further adapted to: cluster the plurality of training iterations into a plurality of iteration groups; in each of a first plurality of training iterations of a first iteration group compute the set of transformed values using the first set consisting of the first identified amount of values and the second set consisting of the second identified amount of values; and for each subsequent group of the plurality of iteration groups not the first iteration group: in each of a subsequent plurality of training iterations of the subsequent group compute the set of transformed values using a new first set consisting of a new first identified amount of values, and a new second set consisting of a new second identified amount of values; wherein each of the new first set and second new set is a value from 0 to 1; wherein the new first identified amount of values is less than or equal the first identified amount of values; and wherein the new second identified amount of values is less than or equal the second identified amount of values. Training the neural network's amount of quantiles (the quantization level), on top of training the neural networks quantization values, may facilitate producing a better trained quantized neural network, where an output of such a trained quantized neural network is more accurate than an output of a neural network having a predetermined quantization level, according to a distance metric from an output of a non-quantized neural network.

With reference to the first and second aspects, in a fourth possible implementation of the first and second aspects of the present invention, the at least one hardware processor is further adapted to: in each additional training iteration of a plurality of additional training iterations: for each other layer, comprising a plurality of other weight values, of one or more other layers of the plurality of layers of the neural network: compute a set of other transformed values by applying to a plurality of other layer values, comprising a plurality of other previous output values of another previous layer and the other layer's plurality of other weight values, the one or more emulated non-uniformly quantized transformations by adding to each other value of the plurality of other layer values the one or more uniformly distributed random noise values; and compute a plurality of other output values by applying to the set of other transformed values the one or more arithmetic operations; compute a plurality of other training output values from a combination of the plurality of other output values of a last layer of the plurality of other layers; and update one or more of the plurality of other weight values of the one or more other layers to decrease another value of the loss function computed using the plurality of target value sets and plurality of other training output values. Optionally, in the plurality of additional training iterations the at least one hardware processor is further adapted to: compute the set of other transformed values only for the one or more other layers; and update only the one or more of the plurality of other weight values of the one or more other layers. Training the neural network's plurality of layers in a plurality of blocks, or clusters, of layers, may facilitate producing a better trained quantized neural network, where an output of such a trained quantized neural network is more accurate than an output of a neural network trained all layers at once, according to a distance metric from an output of a non-quantized neural network.

With reference to the first and second aspects, in a fifth possible implementation of the first and second aspects of the present invention, the at least one hardware processor is adapted to receive the digital data via at least one data communication network interface connected to the at least one hardware processor. Optionally, the at least one hardware processor is adapted to receive the digital data by reading the digital data from a digital storage electrically connected to the at least one hardware processor. Optionally, the at least one hardware processor is adapted to receive the digital data by reading the digital data from a digital storage connected to the at least one hardware processor via at least one data communication network interface connected to the at least one hardware processor.

With reference to the first and second aspects, in a sixth possible implementation of the first and second aspects of the present invention, the at least one hardware processor is adapted to output the updated plurality of weight values by sending the updated plurality of weight values via at least one data communication network interface connected to the at least one hardware processor. Optionally, the at least one hardware processor is adapted to output the updated plurality of weight values by writing the updated plurality of weight values via at least one digital storage connected to the at least one hardware processor.

With reference to the third aspect, in a first possible implementation of the third aspect of the present invention, the non-uniformly quantized neural network data set is generated by: receiving digital input data comprising a plurality of training input value sets and a plurality of target value sets; in each training iteration of a plurality of training iterations: for each layer, comprising a plurality of weight values, of one or more layers of a plurality of layers of a neural network: computing a set of transformed values by applying to a plurality of layer values, comprising a plurality of previous output values of a previous layer and the layer's plurality of weight values, one or more emulated non-uniformly quantized transformations by adding to each value of the plurality of layer values one or more uniformly distributed random noise values; and computing a plurality of output values by applying to the set of transformed values one or more arithmetic operations; computing a plurality of training output values from a combination of the plurality of output values of a last layer of the plurality of layers; and updating one or more of the plurality of weight values of the one or more layers to decrease a value of a loss function computed using the plurality of target value sets and plurality of training output values; and outputting the updated plurality of weight values of the plurality of layers. Using a non-uniformly quantized neural network trained according to the present invention may produce one or more classifications more accurate than one or more other classifications produced by a system using a uniformly quantized neural network, according to a distance metric from one or more reference classifications produced by a system using a non-quantized neural network.

With reference to the fourth aspect, in a first possible implementation of the fourth aspect of the present invention, the non-uniformly quantized neural network data set is generated by: receiving digital input data comprising a plurality of training input value sets and a plurality of target value sets; in each training iteration of a plurality of training iterations: for each layer, comprising a plurality of weight values, of one or more layers of a plurality of layers of a neural network: computing a set of transformed values by applying to a plurality of layer values, comprising a plurality of previous output values of a previous layer and the layer's plurality of weight values, one or more emulated non-uniformly quantized transformations by adding to each value of the plurality of layer values one or more uniformly distributed random noise values; and computing a plurality of output values by applying to the set of transformed values one or more arithmetic operations; computing a plurality of training output values from a combination of the plurality of output values of a last layer of the plurality of layers; and updating one or more of the plurality of weight values of the one or more layers to decrease a value of a loss function computed using the plurality of target value sets and plurality of training output values; and outputting the updated plurality of weight values of the plurality of layers. Using a non-uniformly quantized neural network trained according to the present invention may predict one or more output values more accurate than one or more other output values predicted by a system using a uniformly quantized neural network, according to a distance metric from one or more reference output values predicted by a system using a non-quantized neural network.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
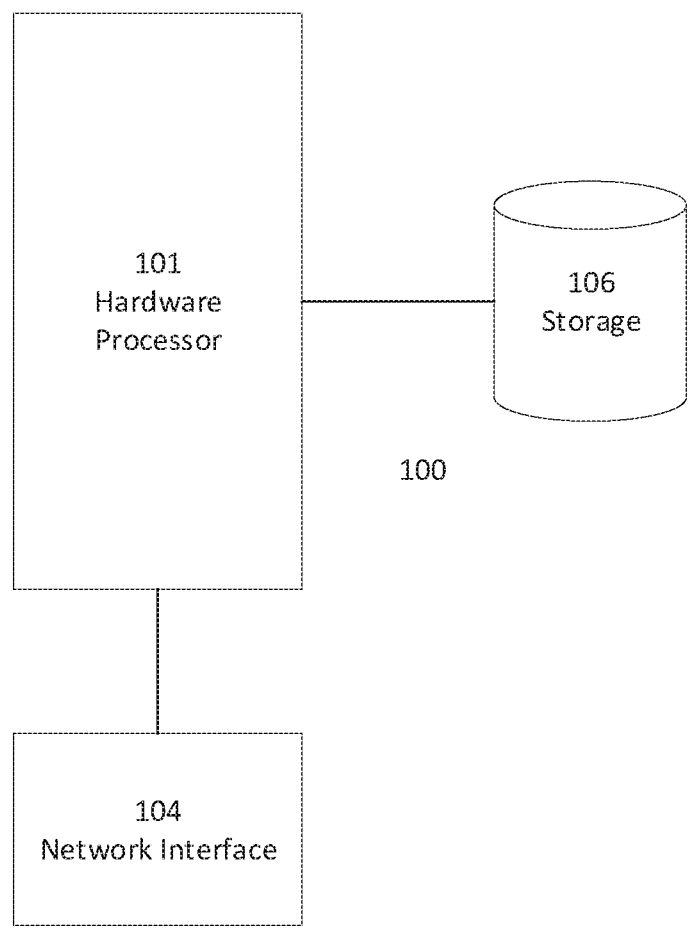
FIG. 1 is a schematic block diagram of an exemplary system for training a quantized neural network, according to some embodiments of the present invention.

The present invention, in some embodiments thereof, relates to a computerized system executing a neural network and, more specifically, but not exclusively, to a computerized system executing a quantized neural network.

A quantization bin is a range of original values that are quantized to an identified quantization value. Some possible methods of quantizing a neural network's plurality of weight values and activation values use uniform quantization where all quantization bins have an equal width, i.e. a first difference between a first highest original value and a first lowest original value quantized to a first quantization bin is equal a second difference between a second highest original value and a second lowest original value quantized to a second quantization bin. However, since a distribution of values of the plurality of weight values and the plurality of activation function outputs tends to assume a bell-shaped distribution and not a uniform distribution, uniform quantization is not optimal according to common distance metrics, for example the Euclidean metric (also known as the $l_2$ metric).

Existing approaches for using non-uniform quantization include iteratively grouping close values and retraining weight values to learn quantization thresholds, and using balanced quantization bins such that each two quantization bins have the same amount of samples (that is, the quantization bins have equal probability mass). However, calculating percentile values for such balanced quantization bins or learning quantization thresholds may require significant computing resources, expensive in time and power consumption. Some approaches attempt to mitigate computation time and resources by using mean values to estimate percentile values, reducing accuracy of the output of a neural network using such quantization.

As used herein, the term "quantile" refers to an interval in a plurality of equal probability mass contiguous intervals dividing a range of values, i.e. a random value in the range of values has an equal probability of being in any quantile of the plurality of quantiles. The term "k-quantile quantizer" refers to a quantization function that divides the range of original values into an amount of quantiles denoted by k (i.e., each interval of the k intervals has a same probability mass of $1/k$) and identifies each of these intervals with one of k quantization bins. The present invention, in some embodiments thereof, proposes using a non-uniformly quantized neural network where the neural network's plurality of weight values and plurality of activation values are non-uniformly quantized using one or more k-quantile quantization functions with k balanced (equal probability) bins, such that for each weight or activation value (denoted by variable X), $$P(X \in [t_{i-1}, t_i]) = 1/k,$$

where $$t_i = G_X^{-1}(1/k)$$

and where $G_X$ denotes the cumulative distribution function of variable X and, accordingly, $G^{-1}{}_X$ denotes the quantile function, which in addition is an inverse function of $G_X$.

In such a k-quantile quantizer, a representation level of an i-th bin is set to the bin's median value denoted by $q_i$, such that $q_i = \text{med}\{X|X \in [t_{i-1}, t_i]\}$.

For a set of values of a variable having a bell-shaped non-uniform distribution, a k-quantile quantizer may limit an effect of the non-uniform distribution's tails, and typically produces more bins closer to the non-uniform distribution's mean value than at the tail values of the non-uniform distribution. In addition, empirically estimating a cumulative distribution $G_X$ and a quantile function $G^{-1}{}_X$ from a neural network's plurality of weight values and activation functions may be performed using methods as known in the art.

In neural network training, the term "backward pass" refers to a process of counting changes in weight values (de facto learning), using a gradient descent algorithm or similar. Computation is made from a last layer, backward to a first layer. As a quantization operator may not be continuous or smooth, it may be impractical to use a quantization operator in a backward pass. In addition, there is a need to reduce an amount of computation resources and an amount of computation time required to determine a quantization function such that the quantization function's error metric is below an identified error threshold.

It is possible to represent a quantization function as an addition of random noise to a value. However, representation of a quantizer applied to non-uniformly distributed data values requires non-uniformly distributed noise. Quantization of a neural network's weight or activation value depends on actual values of the weight or activation value which are difficult to predict or compute in advance, thus it is difficult to produce appropriate noise. To overcome this difficulty, the present invention, in some embodiments thereof, proposes training a quantized neural network by emulating non-uniform quantization of possibly non-uniformly distributed weight and activation values by using uniformly distributed random noise values.

A monotonically increasing transformation preserves quantiles. This property of a monotonically increasing transformation allows constructing a k-quantile quantizer using a non-linear monotonically increasing transformation. In addition, when a variable has a uniform distribution, a k-quantile quantizer for the variable coincides with the variable's k-level uniform quantizer. The present invention proposes applying, in some embodiments thereof, non-uniform quantization using a non-linear transformation and a coinciding uniform quantization function. For a variable denoted by X, let $F_x$ denote a transformation converting variable X into a uniform random variable on the interval [0,1] denoted by U (the uniformized variable), such that $U = F_x(X)$. A uniform k-level quantizer, coinciding with a k-quantile quantizer for U, is denoted by $Q_{uni}$, and $\hat{U}$ denotes the result of applying the k-level quantizer to the uniformized variable such that $\hat{U} = Q_{uni}(U)$. Using the inverse of $F_x$, denoted by $F^{-1}{}_x$, produces a result denoted by $\hat{X}$, such that $\hat{X} = F_x^{-1}(\hat{U})$. Thus $\hat{X} = F_x^{-1}(Q_{uni}(F_x(X)))$ denotes applying a non-uniform quantizer to variable X by using a uniform quantizer and a non-linear transformation.

In addition, the present invention proposes replacing in some embodiments the k-level quantizer by an injection of random additive nose values. In such embodiments, in a forward pass of a neural network's training iteration, instead of applying for a weight denoted by w a k-quantile quantizer denoted by $w' = Q(w)$, the present invention proposes applying an equivalent uniform quantizer to a uniformized variable to produce a quantized value denoted by $\hat{w}$ such that $\hat{w} = F_w^{-1}(Q_{uni}(F_w(w)))$ and using noise injection to emulate the uniform quantizer such that $$\hat{w} = F_w^{-1}(F_w(w) + e)$$

where e denotes a noise value uniformly distributed over the interval $$\left[-\frac{1}{2k}, \frac{1}{2k}\right]$$

A similar quantization may be applied mutatis mutandis to activation values.

Emulating non-uniform quantization using uniformly distributed noise and a non-linear transformation may facilitate reducing computation time and computation resources required to train a quantized neural network, as well as may facilitate generating a quantized neural network having output similar to output of a non-quantized neural network, according to an identified distance metric. In addition, k-quantile training time is independent of the amount k of quantization bins as noise distribution is common for all bins, further improving training time compared to other known methods which require separate processing of each quantization bin, increasing training time for higher bin widths.

The present invention then proposes using, in some embodiments, a trained non-uniformly quantized neural network to classify at least one finding detected in digital data received by the neural network, or predicting at least one output value in response to digital data received by the neural network. Such an operation of the trained neural network is known in the art as inference. Using a non-uniformly quantized neural network may facilitate using a neural network in a device having limited storage, and additionally or alternately, limited processing resources. Successfully training a non-uniformly quantized neural network such that an output of such a neural network is sufficiently accurate according to an identified distance metric may prevent degradation of a neural network's accuracy while reducing an amount of digital storage used by the neural network. In addition, the neural network's accuracy may be preserved while still reducing power consumption, thus extending battery life of a battery-operated device. In a custom designed device, the present invention may facilitate reducing chip area of the custom designed device while preserving the neural network's accuracy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100 for training a quantized neural network, according to some embodiments of the present invention. In such embodiments, at least one hardware processor 101 is connected to at least one digital storage 106 and at least one digital communication network interface 104. Some examples of digital storage are a hard disk drive and a network attached storage. Optionally, at least one digital storage 106 is electrically connected to at least one hardware processor 101, for example when at least one digital storage 106 is a hard disk drive. Optionally, at least one digital storage 106 is connected to at least one hardware processor 101 via at least one digital communication network interface 104, for example when at least one digital storage is a network attached storage. Some examples of a digital communication network interface are an Ethernet interface and a Wireless Fidelity (WiFi) interface. Optionally, at least one digital communication network adapter 104 is connected to a Local Area Network (LAN), for example an Ethernet LAN. Optionally, at least one digital communication network adapter 104 is connected to a Wide Area Network (WAN), for example the Internet. Optionally, at least one hardware processor 101 receives digital input data via at least one network interface 104 for training a neural network executing on at least one hardware processor 104. Optionally, the neural network comprises a plurality of layers. Optionally, at least one hardware processor receives the digital input data by reading the digital input data from at least one storage 106. Optionally, at least one hardware processor 101 stores a plurality of weight values of the neural network on at least one storage 106.

To train a quantized neural network, in some embodiments of the present invention system 100 implements the following optional method.

Figure 2:
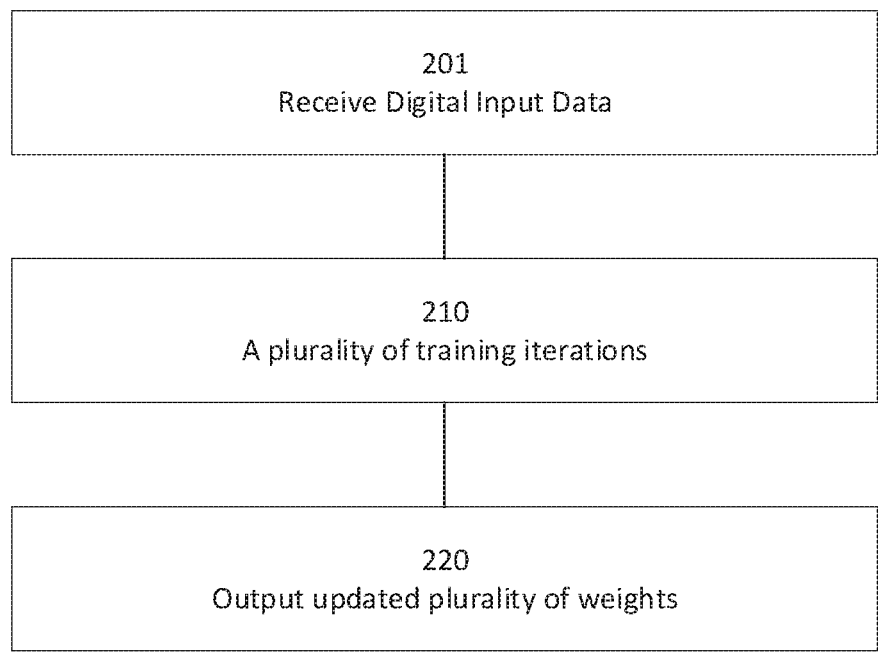
FIG. 2 is a flowchart schematically representing an optional flow of operations for training a quantized neural network, according to some embodiments of the present invention.

Reference is now made also to FIG. 2, showing a flowchart schematically representing an optional flow of operations 200 for training a quantized neural network, according to some embodiments of the present invention. In such embodiments, at least one hardware processor 101 receives in 201 digital input data comprising a plurality of training input value sets and a plurality of target value sets. Optionally, at least one hardware processor 101 reads the digital input data from at least one storage 106. Optionally, at least one hardware processor 101 receives the digital input data via at least one network interface 104. In 210 at least one hardware processor 101 executes a plurality of training iterations.

Figure 3:
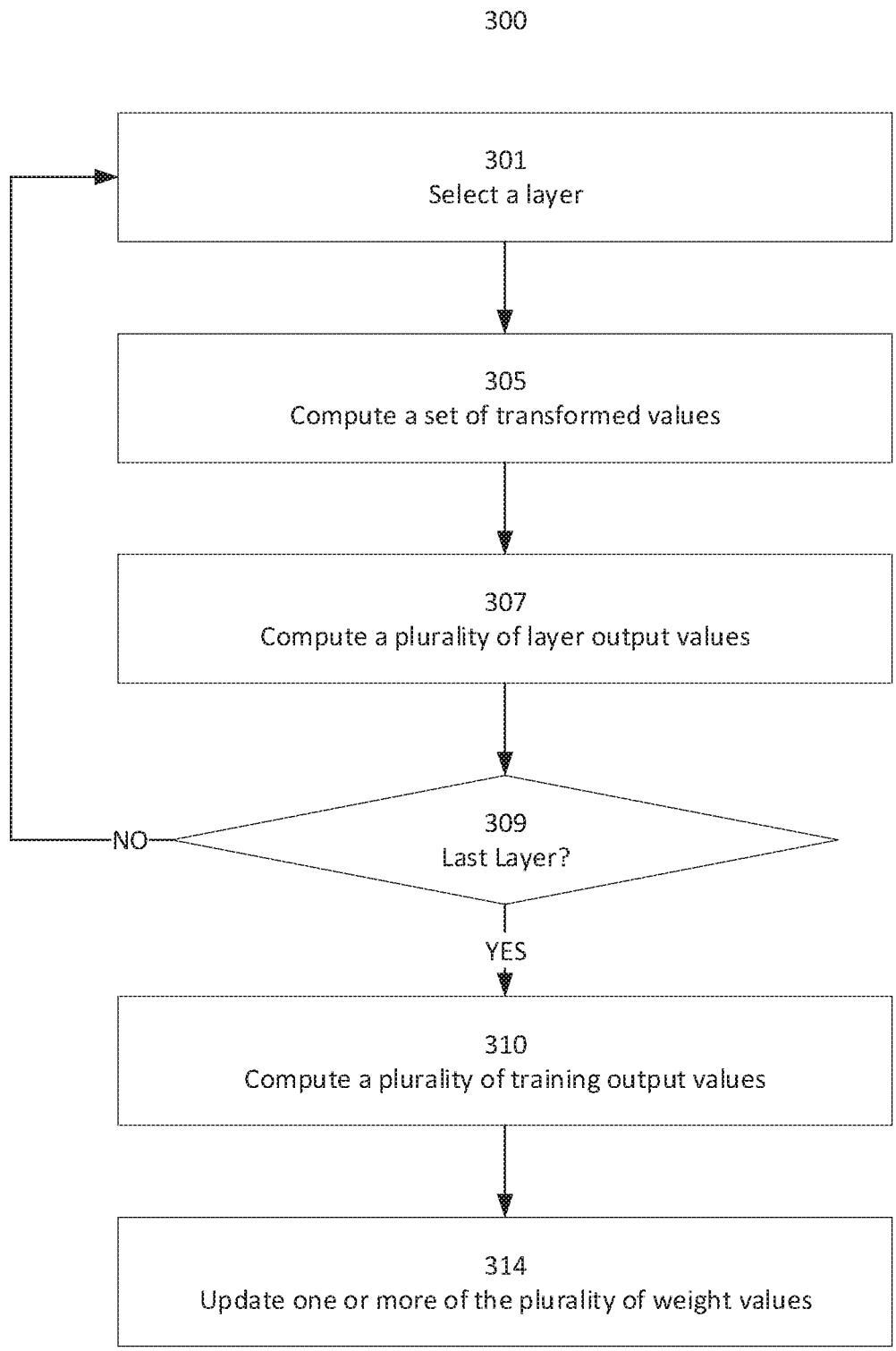
FIG. 3 is a flowchart schematically representing an optional flow of operations for a training iteration, according to some embodiments of the present invention.

Reference is now made also to FIG. 3, showing a flowchart schematically representing an optional flow of operations 300 for a training iteration, according to some embodiments of the present invention. In such embodiments, in each iteration of the plurality of training iterations, at least one hardware processor 101 performs steps 301, 305 and 307 for each layer of one or more layers of a plurality of layers of a neural network. Optionally, the layer comprises a plurality of weight values. In 301 at least one hardware processor 101 optionally selects a layer, in 305 optionally computes a set of transformed values by applying to a plurality of layer values one or more emulated non-uniformly quantized transformations by adding to each value of the plurality of layer values one or more uniformly distributed random noise values and in 307 optionally computes a plurality of layer output values by applying to the set of transformed values one or more arithmetic operations. Optionally, the plurality of layer values comprises a plurality of previous layer output values of a previous layer and the layer's plurality of weight values.

Figure 4:
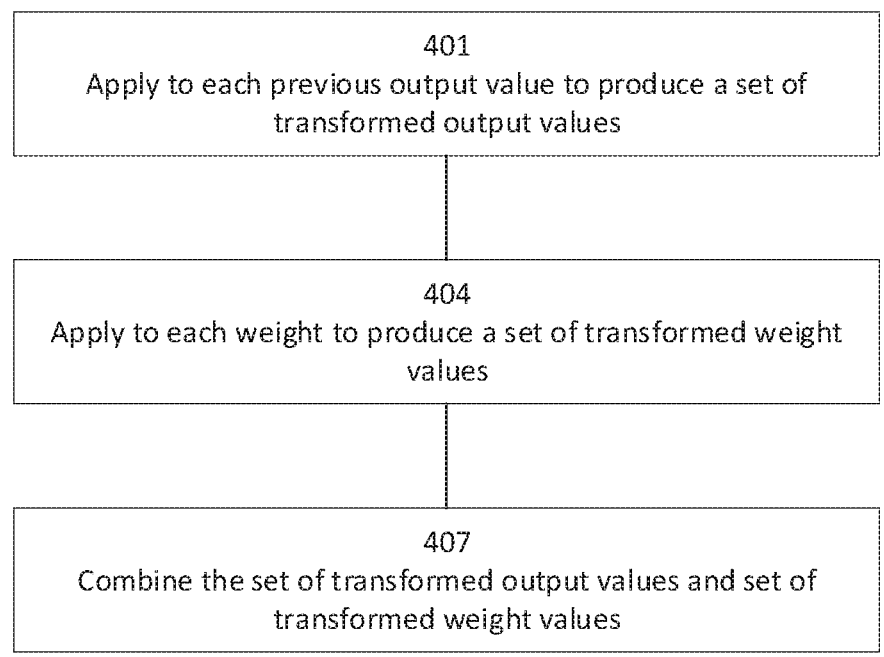
FIG. 4 is a flowchart schematically representing an optional flow of operations for quantizing in one layer, according to some embodiments of the present invention.

To compute the set of transformed values, system 100 optionally implements the following optional method. Reference is now made to FIG. 4, showing a flowchart schematically representing an optional flow of operations 400 for quantizing in one layer, according to some embodiments of the present invention. In such embodiments, at least one hardware processor 101 applies one or more emulated non-uniformly quantized transformations to the plurality of layer values to compute a set of transformed values by applying in 401 to each previous layer output value of the plurality of previous layer output values a first emulated non-uniformly quantized transformation by adding a first uniformly distributed random noise value, having a first distribution and having a first variance, to produce a set of transformed output values. Next in 404, at least one hardware processor optionally applies to each weight value of the layer's plurality of weight values a second emulated non-uniformly quantized transformation by adding a second uniformly distributed random noise value, having a second distribution having a second variance, to produce a set of transformed weight values, and in 407 at least one hardware processor 101 combines the set of transformed output values with the set of transformed weight values to produce the set of transformed values.

Figure 5:
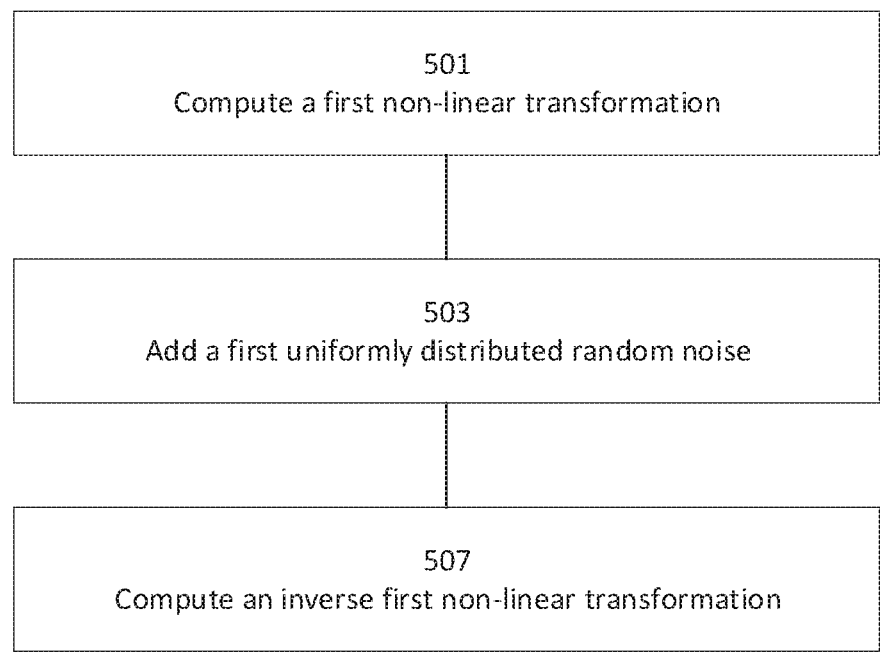
FIG. 5 is a flowchart schematically representing an optional flow of operations for applying non-uniform quantization to an activation function, according to some embodiments of the present invention.

To apply the first non-uniformly quantized transformation to a previous layer output value in 401, system 100 optionally implements the following optional method. Reference is now made also to FIG. 5, showing a flowchart schematically representing an optional flow of operations 500 for applying non-uniform quantization to an activation value, according to some embodiments of the present invention. In such embodiments, at least one hardware processor computes in 501 a first non-linear transformation of the previous layer output value to produce a transformed output value. Optionally, the first non-linear transformation comprises a first combination of a first plurality of arithmetic operations selected from a group of arithmetic operations consisting of: addition, multiplication, and at least one non-linear operator. An example of a non-linear operator is a rectifier, which provides a maximum between 0 and an operand of the rectifier. Optionally, the transformed output value is a value in the range from 0 to 1. Optionally, the transformed output values is selected from a first set consisting of a first identified amount of values, each in the range from 0 to 1, that is the first non-linear transformation is a quantizer in the range 0 to 1, having a first amount of levels equal the first identified amount of values. Optionally, the first uniformly distributed random noise value has a first uniform distribution in a first identified range from a first identified lower value to a first identified upper value. Optionally, the first identified lower value is computed by dividing −1 by the product of 2 and the first amount of values, and the first identified upper value is computed by dividing 1 by the product of 2 and the first amount of values. Next, in 503 at least one hardware processor 101 optionally adds the first uniformly distributed random noise value to the transformed output values to produce a noisy output value, and in 507 optionally computes an inverse first non-linear transformation of the noisy output value. Optionally, the inverse first non-linear transformation is such that computing the inverse first non-linear transformation of the transformed output value produces the previous layer output value.

Figure 6:
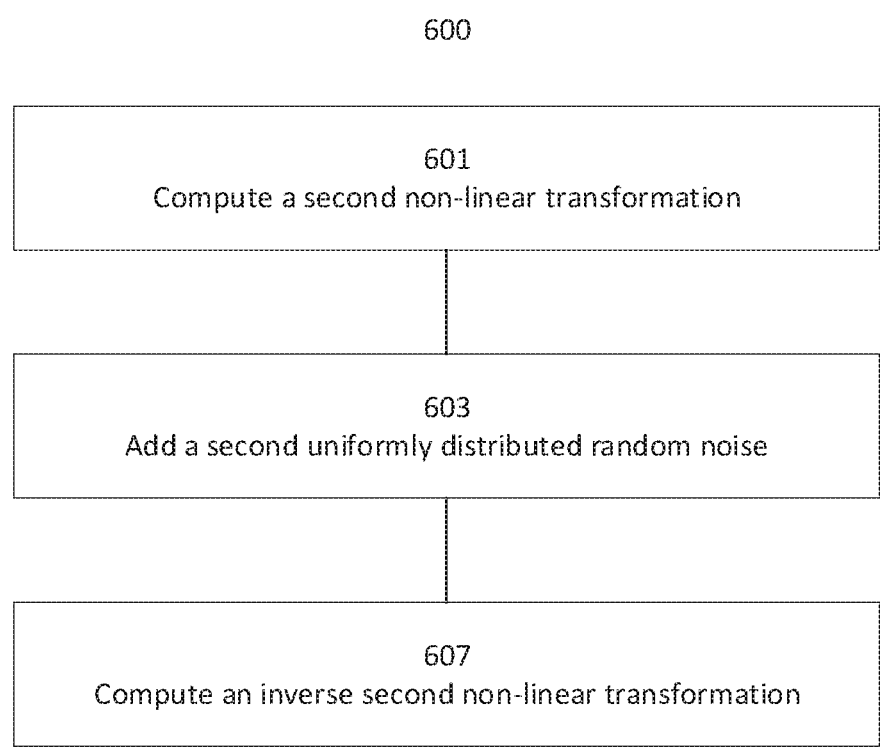
FIG. 6 is a flowchart schematically representing an optional flow of operations for applying non-uniform quantization to a weight, according to some embodiments of the present invention.

Reference is now made again to FIG. 4. To apply the second non-uniformly quantized transformation to a weight value in 404, system 100 optionally implements the following optional method. Reference is now made also to FIG. 6, showing a flowchart schematically representing an optional flow of operations 600 for applying non-uniform quantization to a weight value, according to some embodiments of the present invention. In such embodiments, at least one hardware processor computes in 601 a second non-linear transformation of the weight value to produce a transformed weight value. Optionally, the second non-linear transformation comprises a second combination of a second plurality of arithmetic operations selected from the group of arithmetic operations consisting of: addition, multiplication, and at least one non-linear operator. Optionally, the transformed weight value is a value in the range from 0 to 1. Optionally, the transformed weight values is selected from a second set consisting of a second identified amount of values, each in the range from 0 to 1, that is the second non-linear transformation is a quantizer in the range 0 to 1, having a second amount of levels equal the second identified amount of values. Optionally, the second uniformly distributed random noise value has a second uniform distribution in a second identified range from a second identified lower value to a second identified upper value. Optionally, the second identified lower value is computed by dividing −1 by the product of 2 and the second amount of values, and the second identified upper value is computed by dividing 1 by the product of 2 and the second amount of values. Next, in 603 at least one hardware processor 101 optionally adds the second uniformly distributed random noise value to the transformed weight values to produce a noisy weight value, and in 607 optionally computes an inverse second non-linear transformation of the noisy weight value. Optionally, the inverse second non-linear transformation is such that computing the inverse second non-linear transformation of the transformed weight value produces the weight value.

Reference is now made again to FIG. 3. After determining in 309 that 301, 305 and 307 have been computed for all one or more layers, in 310 at least one hardware processor 101 optionally computes a plurality of training output values from a combination of the plurality of layer output values of a last layer of the plurality of layers, and in 314 at least one hardware processor 101 optionally updates one or more of the plurality of weight values of the one or more layers to decrease a value of a loss function computed using the plurality of target value sets and plurality of training output values.

Reference is now made again to FIG. 2. After executing the plurality of training iterations, at least one hardware processor 101 optionally outputs in 220 the updated plurality of weight values of the plurality of layers, optionally by writing the updated plurality of weight values to at least one storage 106. Optionally, at least one hardware processor sends the updated plurality of weight values via at least one data communication network interface 104.

In some embodiments of the present invention the neural network is quantized gradually. In such embodiments, the plurality of layers of the neural network is clustered in a plurality of layer blocks, each consisting of one or more layers of the plurality of layers. Optionally, each layer block consists of one layer. Optionally, each layer block consists of two layers. Optionally, the plurality of layers are divided approximately equally between the plurality of layer blocks. Optionally, a first plurality of training iterations is used to train the plurality of weights of one or more layers of a first layer block. Next, in such embodiments, system 100 may further implement the following optional method.

Figure 7:
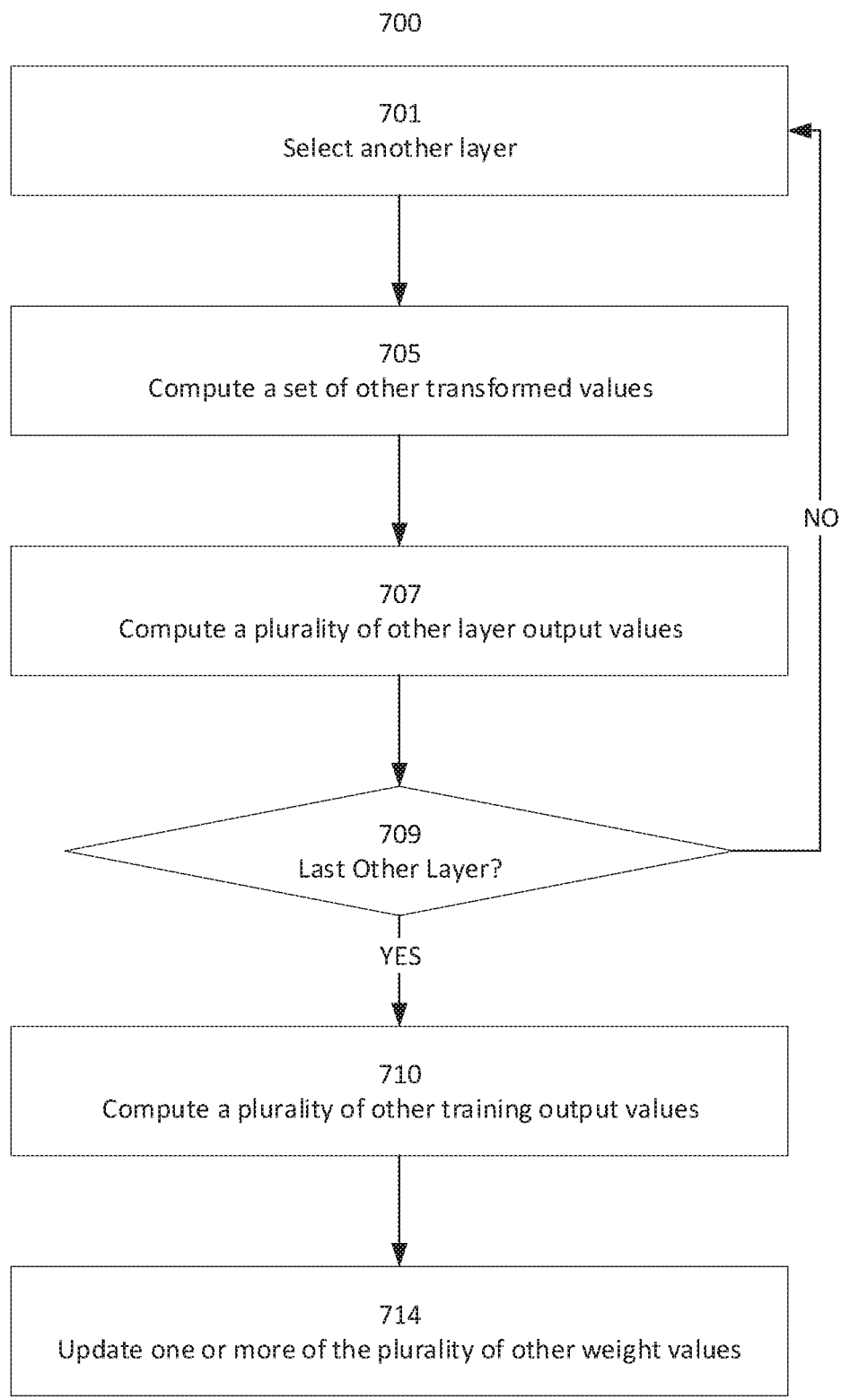
FIG. 7 is a flowchart schematically representing an optional flow of operations for training a quantized neural network in a plurality of blocks, according to some embodiments of the present invention.

Reference is now made to FIG. 7, showing a flowchart schematically representing an optional flow of operations 700 for training a quantized neural network in a plurality of blocks, according to some embodiments of the present invention. In such embodiments, after a first plurality of training iterations to train one or more layers of the plurality of layers of the neural network, at least one hardware processor 101 executes a plurality of additional training iterations to train one or more other layers of the plurality of layers. In each additional training iteration of the plurality of additional training iterations at least one hardware processor executes 701, 705 and 707 for each other layer of one or more other layers. Optionally, the other layer comprises a plurality of other weight values. In 701 at least one hardware processor 101 optionally selects another layer, in 705 optionally computes a set of other transformed values by applying to a plurality of other layer values one or more emulated non-uniformly quantized transformations by adding to each other value of the plurality of other layer values one or more uniformly distributed random noise values and in 707 optionally computes a plurality of other layer output values by applying to the set of other transformed values one or more arithmetic operations. Optionally, the plurality of other layer values comprises a plurality of other previous layer output values of another previous layer and the other layer's plurality of other weight values. After determining in 709 that 701, 705 and 707 have been computed for all one or more other layers, in 710 at least one hardware processor 101 optionally computes a plurality of other training output values from a combination of the plurality of other layer output values of a last layer of the plurality of layers, and in 714 at least one hardware processor 101 optionally updates one or more of the plurality of other weight values of the one or more other layers to decrease another value of the loss function computed using the plurality of target value sets and plurality of other training output values. Optionally, the method is repeated in a plurality of additional pluralities of training iterations, each training another of the plurality of layer blocks. Optionally, when training the one or more layers of one layer block, at least one hardware processor 101 freezes the plurality of weights of all other layers of the plurality of layers not in the one layer block, that is at least one hardware processor 101 computes the set of other transformed values only for the one or more other layers and updates only the one or more of the plurality of other weight values of the one or more other layers.

The present invention allows, in some embodiments, learning a preferred first amount of quantization levels and a second amount of quantization levels. To do so, system 100 implements in some embodiments the following optional method.

Figure 8:
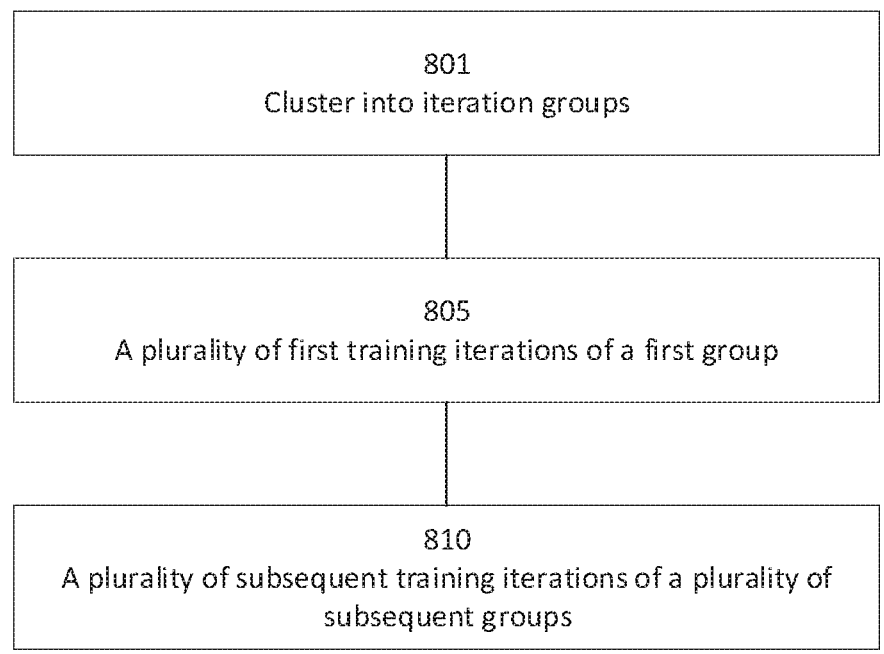
FIG. 8 is a flowchart schematically representing an optional flow of operations for training a quantized neural network by changing quantization levels, according to some embodiments of the present invention.

Reference is now made to FIG. 8, showing a flowchart schematically representing an optional flow of operations 800 for training a quantized neural network by changing quantization levels, according to some embodiments of the present invention. In such embodiments, in 80 at least one hardware processor 101 clusters the plurality of training iterations into a plurality of iteration groups, then optionally executes in 805 a first plurality of training iterations of a first group. Optionally, in each of the first plurality of training iterations, at least one hardware processor computes the set of transformed values using the first set consisting of the first identified amount of values and the second set consisting of the second identified amount of values. Next, in 810, at least one hardware processor optionally executes a plurality of subsequent training iterations of a subsequent group of the plurality of iteration groups not the first iteration group. Optionally, in each of the subsequent plurality of training iterations of the subsequent group, at least one hardware processor 101 computes the set of transformed values using a new first set consisting of a new first identified amount of values and a new second set consisting of a new second identified amount of values. Optionally, each of the new first set and new second set is a value from 0 to 1. Optionally, the new first identified amount of values is less than or equal the first identified amount of values. For example, when the first identified amount of values is 32, the new first identified amount of values may be 16 or 8. Optionally, the new first identified amount of values is not a power of 2. Optionally, the new second identified amount of values is less than or equal the second identified amount of values. For example, when the second identified amount of values is 32, the new second identified amount of values may be 16 or 8. Optionally, the new second identified amount of values is not a power of 2. Optionally, at least one hardware processor 101 executes 810 repeatedly for a plurality of subsequent groups.

A non-uniformly quantized neural network may be used by a system to detect and classify findings in digital data. A non-uniformly quantized neural network may be used by system to predict at least one output value in response to receiving digital data.

Figure 9:
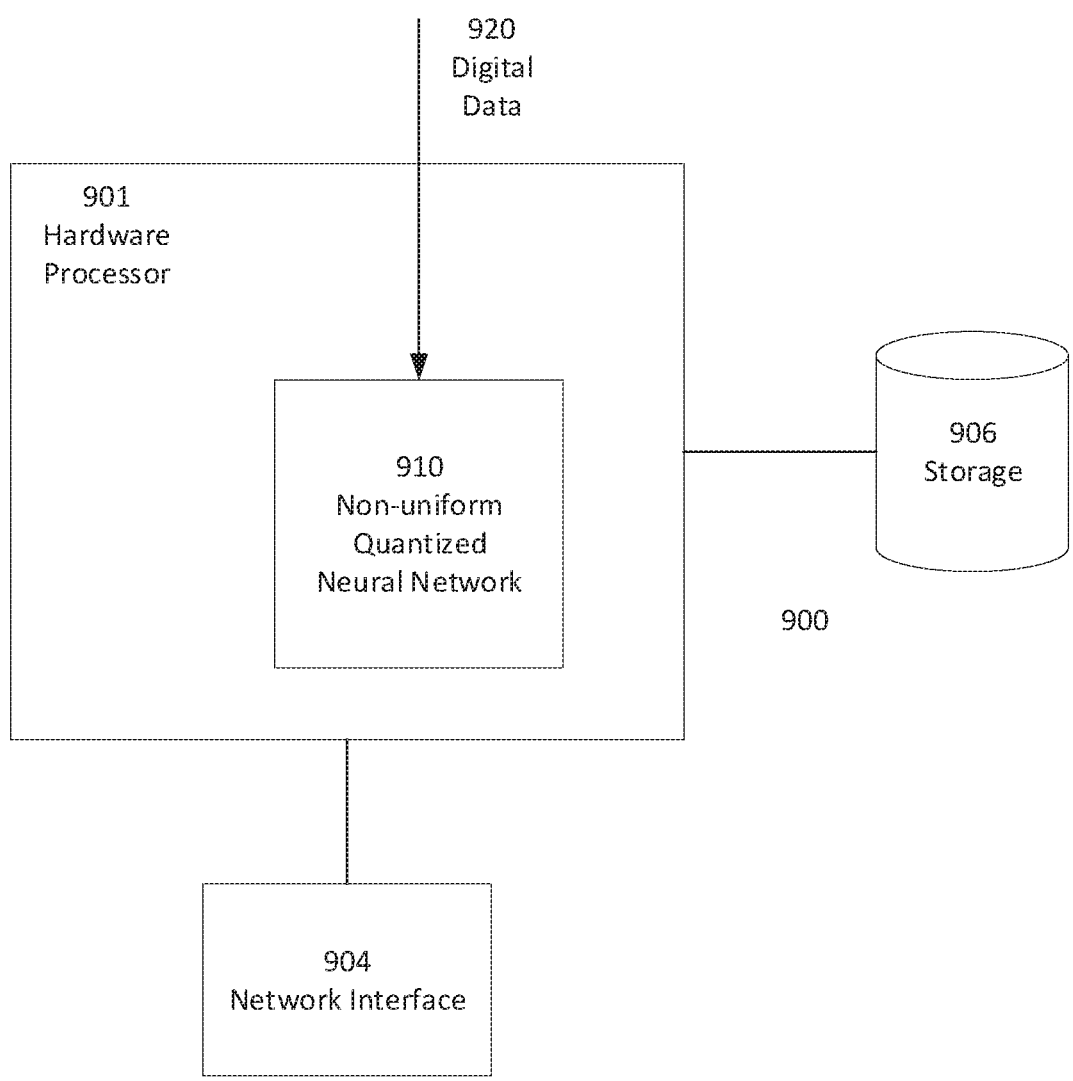
FIG. 9 is a schematic block diagram of an exemplary system using a quantized neural network, according to some embodiments of the present invention.

Reference is now made also to FIG. 9, showing a schematic block diagram of an exemplary system 900 using a quantized neural network, according to some embodiments of the present invention. In such embodiments, at least one hardware processor 901 executes at least one non-uniformly quantized neural network 910. Optionally, at least one hardware processor 901 is connected to at least one digital storage 906. Optionally, at least one hardware processor 901 is connected to at least one digital communication network interface 904. Some examples of digital storage are a hard disk drive and a network attached storage. Optionally, at least one digital storage 906 is electrically connected to at least one hardware processor 901, for example when at least one digital storage 906 is a hard disk drive. Optionally, at least one digital storage 906 is connected to at least one hardware processor 901 via at least one digital communication network interface 904, for example when at least one digital storage 906 is a network attached storage. Some examples of a digital communication network interface are an Ethernet interface and a Wireless Fidelity (WiFi) interface. Optionally, at least one digital communication network adapter 904 is connected to a Local Area Network (LAN), for example an Ethernet LAN. Optionally, at least one digital communication network adapter 904 is connected to a Wide Area Network (WAN), for example the Internet. Optionally, at least one hardware processor 901 receives digital data 920. Optionally, at least one hardware processor 901 receives digital data 920 via at least one digital communication network interface 904. Optionally, at least one non-uniformly quantized neural network 910 was trained using system 100. Optionally, at least one hardware processor 901 predicts at least one output value according to a data set of at least one non-uniformly quantized neural network 910 in response to receiving digital data 920. For example, system 900 may be used to correct an image by predicting one or more values of an output image. Some examples of image corrections are color corrections, lighting corrections, and sharpening. In another example, in some embodiments at least one hardware processor 901 isolates a human speaker from an audio recording, by predicting one or more values of the audio recording without background sounds. Optionally, at least one hardware processor 901 classifies at least one finding detected in digital data 920 according to the data set of at least one non-uniformly quantized neural network 910 in response to receiving digital data 920. For example, in some embodiments at least one hardware processor 901 detects and classifies one or more objects in one or more input digital images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant non-linear transformations and neural network predictions and classifications will be developed and the scope of the terms "non-linear transformation", "classification" and "prediction" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A system for training a classification system's quantized neural network dataset, comprising at least one hardware processor adapted to:
    receive digital input data comprising a plurality of training input value sets and a plurality of target value sets;
    in each training iteration of a plurality of training iterations:
    for each layer, comprising a plurality of weight values, of one or more layers of a plurality of layers of a neural network:
    compute a set of transformed values by applying to a plurality of layer values, comprising a plurality of previous layer output values of a previous layer and the layer's plurality of weight values, one or more emulated non-uniformly quantized transformations by adding to each value of the plurality of layer values one or more uniformly distributed random noise values; and
    compute a plurality of layer output values by applying to the set of transformed values one or more arithmetic operations;
    compute a plurality of training output values from a combination of the plurality of layer output values of a last layer of the plurality of layers; and
    update one or more of the plurality of weight values of the one or more layers to decrease a value of a loss function computed using the plurality of target value sets and plurality of training output values; and
    output the updated plurality of weight values of the plurality of layers;
    wherein the at least one hardware processor applies the one or more emulated non-uniformly quantized transformations to the plurality of layer values to compute a set of transformed values by:
    applying to each previous layer output value of the plurality of previous layer output values a first emulated non-uniformly quantized transformation by adding a first uniformly distributed random noise value, having a first distribution having a first variance, to produce a set of transformed output values;
    applying to each weight value of the layer's plurality of weight values a second emulated non-uniformly quantized transformation by adding a second uniformly distributed random noise value, having a second distribution having a second variance, to produce a set of transformed weight values; and
    combining the set of transformed output values with the set of transformed weight values to produce the set of transformed values.

2. The system of claim 1, wherein applying to a previous layer output value a first emulated non-uniformly quantized transformation by adding a first uniformly distributed random noise value comprises:
   computing a first non-linear transformation of the previous layer output value to produce a transformed output value;
   adding the first uniformly distributed random noise value to the transformed output value to produce a noisy output value; and
   computing an inverse first non-linear transformation of the noisy output value, wherein the inverse first non-linear transformation is such that computing the inverse first non-linear transformation of the transformed output value produces the previous layer output value.

3. The system of claim 1, wherein applying to a weight value a second emulated non-uniformly quantized transformation by adding a second uniformly distributed random noise value comprises:
   computing a second non-linear transformation of the weight value to produce a transformed weight value; and
   adding the second uniformly distributed random noise value to the transformed weight value to produce a noisy weight value; and
   computing an inverse second non-linear transformation of the noisy weight value, wherein the inverse second non-linear transformation is such that computing the inverse second non-linear transformation of the transformed weight value produces the weight value.

4. The system of claim 2, wherein the first non-linear transformation comprises a first combination of a first plurality of arithmetic operations selected from a group of arithmetic operators consisting of: addition, multiplication, and at least one non-linear operator.

5. The system of claim 3, wherein the second non-linear transformation comprises a second combination of a second plurality of arithmetic operations selected from a group of arithmetic operators consisting of: addition, multiplication, and at least one non-linear operator.

6. The system of claim 1, wherein the transformed output value is in the range from 0 to 1; and
   wherein the transformed weight value is in the range from 0 to 1.

7. The system of claim 1, wherein the transformed output value is selected from a first set consisting of a first identified amount of values, each in the range from 0 to 1; and
   wherein the transformed weight value is selected from a second set consisting of a second identified amount of values, each in the range from 0 to 1.

8. The system of claim 7, wherein the first uniformly distributed random noise value has a first uniform distribution in a first identified range from a first identified lower value to a first identified upper value;
   wherein the first identified lower value is computed by dividing −1 by the product of 2 and the first identified amount of values;
   wherein the first identified upper value is computed by dividing 1 by the product of 2 and the first identified amount of values;
   wherein the second uniformly distributed random noise value has a second uniform distribution in a second identified range from a second identified lower value to a second identified upper value;
   wherein the second identified lower value is computed by dividing −1 by the product of 2 and the second identified amount of values; and
   wherein the second identified upper value is computed by dividing 1 by the product of 2 and the second identified amount of values.

9. The system of claim 1, wherein the at least one hardware processor is further adapted to:
   in each additional training iteration of a plurality of additional training iterations:
   for each other layer, comprising a plurality of other weight values, of one or more other layers of the plurality of layers of the neural network:
   compute a set of other transformed values by applying to a plurality of other layer values, comprising a plurality of other previous output values of another previous layer and the other layer's plurality of other weight values, the one or more emulated non-uniformly quantized transformations by adding to each other value of the plurality of other layer values the one or more uniformly distributed random noise values; and
   compute a plurality of other output values by applying to the set of other transformed values the one or more arithmetic operations;
   compute a plurality of other training output values from a combination of the plurality of other output values of a last layer of the plurality of other layers; and
   update one or more of the plurality of other weight values of the one or more other layers to decrease another value of the loss function computed using the plurality of target value sets and plurality of other training output values.

10. A system for training a classification system's quantized neural network dataset, comprising at least one hardware processor adapted to:
   receive digital input data comprising a plurality of training input value sets and a plurality of target value sets;
   in each training iteration of a plurality of training iterations:
   for each layer, comprising a plurality of weight values, of one or more layers of a plurality of layers of a neural network:
   compute a set of transformed values by applying to a plurality of layer values, comprising a plurality of previous layer output values of a previous layer and the layer's plurality of weight values, one or more emulated non-uniformly quantized transformations by adding to each value of the plurality of layer values one or more uniformly distributed random noise values; and
   compute a plurality of layer output values by applying to the set of transformed values one or more arithmetic operations;
   compute a plurality of training output values from a combination of the plurality of layer output values of a last layer of the plurality of layers; and
   update one or more of the plurality of weight values of the one or more layers to decrease a value of a loss function computed using the plurality of target value sets and plurality of training output values; and
   output the updated plurality of weight values of the plurality of layers,
   wherein the at least one hardware processor is adapted to receive the digital data by one of the following:
   via at least one data communication network interface connected to the at least one hardware processor,
   reading the digital data from a digital storage electrically connected to the at least one hardware processor, and
   reading the digital data from a digital storage connected to the at least one hardware processor via at least one data communication network interface connected to the at least one hardware processor.

11. A system for training a classification system's quantized neural network dataset, comprising at least one hardware processor adapted to:
receive digital input data comprising a plurality of training input value sets and a plurality of target value sets;
in each training iteration of a plurality of training iterations:
for each layer, comprising a plurality of weight values, of one or more layers of a plurality of layers of a neural network;
compute a set of transformed values by applying to a plurality of layer values, comprising a plurality of previous layer output values of a previous layer and the layer's plurality of weight values, one or more emulated non-uniformly quantized transformations by adding to each value of the plurality of layer values one or more uniformly distributed random noise values; and
compute a plurality of layer output values by applying to the set of transformed values one or more arithmetic operations;
compute a plurality of training output values from a combination of the plurality of layer output values of a last layer of the plurality of layers; and
update one or more of the plurality of weight values of the one or more layers to decrease a value of a loss function computed using the plurality of target value sets and plurality of training output values; and
output the updated plurality of weight values of the plurality of layers;
wherein the at least one hardware processor is adapted to output the updated plurality of weight values by one of the following:
sending the updated plurality of weight values via at least one data communication network interface connected to the at least one hardware processor, and
writing the updated plurality of weight values via at least one digital storage connected to the at least one hardware processor.

12. The system of claim 9, wherein in the plurality of additional training iterations the at least one hardware processor is further adapted to:
compute the set of other transformed values only for the one or more other layers; and
update only the one or more of the plurality of other weight values of the one or more other layers.

13. The system of claim 7, wherein the at least one hardware processor is further adapted to:
cluster the plurality of training iterations into a plurality of iteration groups;
in each of a first plurality of training iterations of a first iteration group compute the set of transformed values using the first set consisting of the first identified amount of values and the second set consisting of the second identified amount of values; and
for each subsequent group of the plurality of iteration groups not the first iteration group:
in each of a subsequent plurality of training iterations of the subsequent group compute the set of transformed values using a new first set consisting of a new first identified amount of values, and a new second set consisting of a new second identified amount of values;
wherein each of the new first set and second new set is a value from 0 to 1;
wherein the new first identified amount of values is less than or equal the first identified amount of values; and
wherein the new second identified amount of values is less than or equal the second identified amount of values.

14. A method for training a classification system's quantized neural network dataset, comprising:
receiving by at least one hardware processor digital input data comprising a plurality of training input value sets and a plurality of target value sets;
in each training iteration of a plurality of training iterations:
for each layer, comprising a plurality of weight values, of one or more layers of a plurality of layers of a neural network:
computing a set of transformed values by applying to a plurality of layer values, comprising a plurality of previous output values of a previous layer and the layer's plurality of weight values, one or more emulated non-uniformly quantized transformations by adding to each value of the plurality of layer values one or more uniformly distributed random noise values; and
computing a plurality of output values by applying to the set of transformed values one or more arithmetic operations;
computing a plurality of training output values from a combination of the plurality of output values of a last layer of the plurality of layers; and
updating one or more of the plurality of weight values of the one or more layers to decrease a value of a loss function computed using the plurality of target value sets and plurality of training output values; and
outputting the updated plurality of weight values of the plurality of layers; applying the one or more emulated non-uniformly quantized transformations to the plurality of layer values to compute a set of transformed values by:
applying to each previous layer output value of the plurality of previous layer output values a first emulated non-uniformly quantized transformation by adding a first uniformly distributed random noise value, having a first distribution having a first variance, to produce a set of transformed output values;
applying to each weight value of the layer's plurality of weight values a second emulated non-uniformly quantized transformation by adding a second uniformly distributed random noise value, having a second distribution having a second variance, to produce a set of transformed weight values; and
combining the set of transformed output values with the set of transformed weight values to produce the set of transformed values.

15. A system for detection and classification of findings in digital data, comprising at least one hardware processor configured to:
accessing a non-uniformly quantized neural network data; and
classifying at least one finding detected in the digital data according to the non-uniformly quantized neural network data set in response to receiving the digital data;
wherein the non-uniformly quantized neural network data set is generated by:
receiving digital input data comprising a plurality of training input value sets and a plurality of target value sets;
in each training iteration of a plurality of training iterations:

for each layer, comprising a plurality of weight values, of one or more layers of a plurality of layers of a neural network:

computing a set of transformed values by applying to a plurality of layer values, comprising a plurality of previous output values of a previous layer and the layer's plurality of weight values, one or more emulated non-uniformly quantized transformations by adding to each value of the plurality of layer values one or more uniformly distributed random noise values; and computing a plurality of output values by applying to the set of transformed values one or more arithmetic operations;

computing a plurality of training output values from a combination of the plurality of output values of a last layer of the plurality of layers; and updating one or more of the plurality of weight values of the one or more layers to decrease a value of a loss function computed using the plurality of target value sets and plurality of training output values; and outputting the updated plurality of weight values of the plurality of layers;

applying the one or more emulated non-uniformly quantized transformations to the plurality of layer values to compute a set of transformed values by:

applying to each previous layer output value of the plurality of previous layer output values a first emulated non-uniformly quantized transformation by adding a first uniformly distributed random noise value, having a first distribution having a first variance, to produce a set of transformed output values;

applying to each weight value of the layer's plurality of weight values a second emulated non-uniformly quantized transformation by adding a second uniformly distributed random noise value, having a second distribution having a second variance, to produce a set of transformed weight values; and combining the set of transformed output values with the set of transformed weight values to produce the set of transformed values.

16. A system for regression of digital data, comprising at least one hardware processor configured to:

accessing a non-uniformly quantized neural network data; and predicting at least one output value according to the non-uniformly quantized neural network data set in response to receiving the digital data;

wherein the non-uniformly quantized neural network data set is generated by:

receiving digital input data comprising a plurality of training input value sets and a plurality of target value sets;

in each training iteration of a plurality of training iterations:

for each layer, comprising a plurality of weight values, of one or more layers of a plurality of layers of a neural network:

computing a set of transformed values by applying to a plurality of layer values, comprising a plurality of previous output values of a previous layer and the layer's plurality of weight values, one or more emulated non-uniformly quantized transformations by adding to each value of the plurality of layer values one or more uniformly distributed random noise values; and computing a plurality of output values by applying to the set of transformed values one or more arithmetic operations;

computing a plurality of training output values from a combination of the plurality of output values of a last layer of the plurality of layers; and updating one or more of the plurality of weight values of the one or more layers to decrease a value of a loss function computed using the plurality of target value sets and plurality of training output values; and outputting the updated plurality of weight values of the plurality of layers;

applying the one or more emulated non-uniformly quantized transformations to the plurality of layer values to compute a set of transformed values by:

applying to each previous layer output value of the plurality of previous layer output values a first emulated non-uniformly quantized transformation by adding a first uniformly distributed random noise value, having a first distribution having a first variance, to produce a set of transformed output values;

applying to each weight value of the layer's plurality of weight values a second emulated non-uniformly quantized transformation by adding a second uniformly distributed random noise value, having a second distribution having a second variance, to produce a set of transformed weight values; and combining the set of transformed output values with the set of transformed weight values to produce the set of transformed values.

\* \* \* \* \*